United States Patent
Forrester et al.

(10) Patent No.: US 9,964,238 B2
(45) Date of Patent: *May 8, 2018

(54) STRETCH HOSE AND HOSE PRODUCTION METHOD

(71) Applicant: GLOBALMED, INC., Trenton (CA)

(72) Inventors: Martin E Forrester, Trenton (CA); Carl J Garrett, Beverly, MA (US)

(73) Assignee: GlobalMed, Inc., Trenton, Ontario (CA)

( * ) Notice: Subject to any disclaimer, the term of this patent is extended or adjusted under 35 U.S.C. 154(b) by 518 days.

This patent is subject to a terminal disclaimer.

(21) Appl. No.: 14/120,981

(22) Filed: Jul. 18, 2014

(65) Prior Publication Data

US 2014/0332108 A1    Nov. 13, 2014

Related U.S. Application Data

(63) Continuation-in-part of application No. 13/986,465, filed on May 6, 2013, now Pat. No. 9,308,698, which is a continuation of application No. 12/799,263, filed on Apr. 21, 2010, now Pat. No. 8,453,681, which is a continuation-in-part of application No. 12/354,291, filed on Jan. 15, 2009, application No. 14/120,981, which is a continuation-in-part of application No.

(Continued)

(51) Int. Cl.
| | |
|---|---|
| *F16L 11/112* | (2006.01) |
| *B29D 23/18* | (2006.01) |
| *B29C 71/02* | (2006.01) |
| *B29L 23/00* | (2006.01) |

(52) U.S. Cl.
CPC ............ *F16L 11/112* (2013.01); *B29D 23/18* (2013.01); *B29C 2071/022* (2013.01); *B29L 2023/005* (2013.01)

(58) Field of Classification Search
USPC .................. 156/143, 190, 195, 244.13
See application file for complete search history.

(56) References Cited

U.S. PATENT DOCUMENTS

| | | | |
|---|---|---|---|
| 2,398,876 A | 4/1946 | Bailey | 156/194 |
| 2,430,081 A | 11/1947 | Thomas et al. | 156/144 |

(Continued)

FOREIGN PATENT DOCUMENTS

| | | |
|---|---|---|
| DE | 3312434 A1 | 4/1983 |
| DE | 8426279 U1 | 9/1984 |

(Continued)

*Primary Examiner* — Jeffry H Aftergut
(74) *Attorney, Agent, or Firm* — David A. Burge

(57) ABSTRACT

An extensible-retractable helically reinforced hose is formed by helically wrapping a freshly extruded bead of thermoplastic material about a rotating mandrel to form a helical array of spaced reinforcing coils, and by helically wrapping a freshly extruded thin yet wide web of thermoplastic material so edge regions of the wide web are placed onto and bond continuously with the peripheries of each adjacent pair of the reinforcing coils, with a leading edge region of each new wrap of the web overlying and bonding to a trailing edge region of a prior web wrap. Central portions of each web wrap extend radially inwardly and are sandwiched between adjacent reinforcing coils when the hose is retracted to a minimal axial length.

9 Claims, 4 Drawing Sheets

Related U.S. Application Data

13/507,172, filed on Jun. 11, 2012, now Pat. No. 9,505,164, and a continuation-in-part of application No. 13/987,837, filed on Sep. 6, 2013, now Pat. No. 9,365,004, which is a continuation-in-part of application No. 13/986,465, filed on May 6, 2013, now Pat. No. 9,308,698.

(60) Provisional application No. 61/335,023, filed on Dec. 30, 2009, provisional application No. 61/627,425, filed on Oct. 12, 2011, provisional application No. 61/958,223, filed on Jul. 23, 2013, provisional application No. 61/958,099, filed on Jul. 19, 2013.

(56) References Cited

U.S. PATENT DOCUMENTS

| | | | | |
|---|---|---|---|---|
| 2,731,070 A * | 1/1956 | Meissner | | B29C 53/785 138/132 |
| 2,734,616 A | 3/1956 | Duff | | 138/122 |
| 2,740,427 A | 4/1956 | Swan | | 138/122 |
| 2,954,802 A | 10/1960 | Duff | | 138/122 |
| 2,961,007 A | 11/1960 | Martin | | 138/122 |
| 2,963,750 A | 12/1960 | Pavlic | | 156/144 |
| 3,080,891 A | 3/1963 | Duff | | 138/122 |
| 3,122,171 A | 2/1964 | Britton et al. | | 138/129 |
| 3,152,202 A | 10/1964 | Murphy, Jr. | | 264/167 |
| 3,155,559 A | 11/1964 | Hall | | 156/195 |
| 3,173,822 A | 3/1965 | Rigaut | | 156/429 |
| 3,189,053 A | 6/1965 | Parr | | 138/133 |
| 3,199,541 A | 8/1965 | Richitelli | | 138/129 |
| 3,243,328 A | 3/1966 | Britton et al. | | 156/195 |
| 3,248,272 A | 4/1966 | Sawada | | 156/143 |
| 3,255,780 A | 6/1966 | Squirrell | | 138/122 |
| 3,271,064 A | 9/1966 | Hall | | 264/508 |
| 3,272,678 A | 9/1966 | Swan | | 156/429 |
| 3,297,122 A | 1/1967 | Beck | | 138/122 |
| 3,301,734 A | 1/1967 | Britton et al. | | 156/425 |
| 3,336,172 A | 8/1967 | Hall | | 156/143 |
| 3,349,806 A | 10/1967 | Roberts | | 138/122 |
| 3,486,532 A | 12/1969 | Sawada | | 138/122 |
| 3,536,559 A | 10/1970 | Pelley et al. | | 156/429 |
| 3,635,255 A | 1/1972 | Kramer | | 138/122 |
| 3,674,056 A | 7/1972 | D'Aprile | | 138/134 |
| 3,706,624 A | 12/1972 | Rinker | | 156/432 |
| 3,739,815 A | 6/1973 | Rejeski | | 138/122 |
| 3,847,001 A | 11/1974 | Thamasett | | 72/96 |
| 3,861,424 A | 1/1975 | Mizutani et al. | | 138/119 |
| 3,889,716 A | 6/1975 | Linhart | | 138/129 |
| 3,890,181 A | 6/1975 | Stent et al. | | 156/143 |
| 3,910,808 A | 10/1975 | Steward | | 156/429 |
| 3,962,019 A | 6/1976 | Rejeski | | 156/428 |
| 3,963,856 A | 6/1976 | Carlson et al. | | 174/47 |
| 3,966,525 A | 6/1976 | Steward | | 156/195 |
| 4,010,054 A | 3/1977 | Bradt | | 156/173 |
| 4,012,272 A | 3/1977 | Tiner | | 156/429 |
| 4,038,519 A | 7/1977 | Foucras | | 219/301 |
| 4,043,856 A | 8/1977 | Steward | | 156/195 |
| 4,098,298 A | 7/1978 | Vohrer | | 138/122 |
| 4,167,645 A | 9/1979 | Carey | | 174/47 |
| 4,172,474 A | 10/1979 | Stahl | | 138/132 |
| 4,196,031 A | 4/1980 | Lalikos et al. | | 156/143 |
| 4,203,476 A | 5/1980 | Vitellaro | | 138/122 |
| 4,233,097 A | 11/1980 | Stahl | | 156/143 |
| 4,294,636 A | 10/1981 | Vitellaro | | 156/143 |
| 4,304,266 A | 12/1981 | Kutnyak et al. | | 138/129 |
| 4,337,800 A | 7/1982 | Carlson et al. | | 138/122 |
| 4,342,612 A | 8/1982 | Lalikos et al. | | 156/143 |
| 4,350,547 A | 9/1982 | Kanao | | 156/143 |
| 4,354,051 A | 10/1982 | Kutnyak | | 174/47 |
| 4,375,381 A | 3/1983 | Carlson et al. | | 156/195 |
| 4,383,555 A | 5/1983 | Finley | | 138/129 |
| 4,459,168 A | 7/1984 | Anselm | | 156/143 |
| 4,489,759 A | 12/1984 | Yamamura | | 138/122 |
| 4,490,200 A | 12/1984 | Dillon | | 156/143 |
| 4,490,575 A | 12/1984 | Kutnyak | | 174/47 |
| 4,501,948 A | 2/1985 | Yampolsky et al. | | 219/121 |
| 4,521,270 A | 6/1985 | Lupke | | 156/429 |
| 4,575,400 A | 3/1986 | Ueda et al. | | 156/428 |
| 4,587,145 A | 5/1986 | Kanao | | 428/36 |
| 4,599,784 A | 7/1986 | Canu, Jr. et al. | | 29/450 |
| 4,686,354 A | 8/1987 | Makin | | 219/301 |
| 4,714,508 A | 12/1987 | Chivens et al. | | 156/195 |
| 4,780,261 A | 10/1988 | Vajtay | | 264/285 |
| 4,826,423 A | 5/1989 | Kemp et al. | | 425/505 |
| 4,867,671 A | 9/1989 | Nagayoshi et al. | | 425/391 |
| 5,357,948 A | 10/1994 | Eilentropp | | 128/204.17 |
| 5,454,061 A | 9/1995 | Carlson | | 392/478 |
| 5,485,870 A | 1/1996 | Kraik | | 138/122 |
| 5,526,849 A | 6/1996 | Gray | | 138/133 |
| 5,537,996 A | 7/1996 | McPhee | | 128/204.17 |
| 5,555,915 A | 9/1996 | Kanao | | 138/133 |
| 5,637,168 A | 6/1997 | Carlson | | 156/143 |
| 5,819,518 A | 10/1998 | Kanao | | 57/3 |
| 5,848,223 A * | 12/1998 | Carlson | | A61M 16/1095 219/528 |
| 6,000,435 A | 12/1999 | Patel et al. | | 138/122 |
| 6,024,132 A | 2/2000 | Fujimoto | | 138/122 |
| 6,152,186 A | 11/2000 | Arney et al. | | 138/129 |
| 6,190,480 B1 | 2/2001 | Carlson | | 156/143 |
| 6,219,490 B1 | 4/2001 | Gibertoni et al. | | 392/472 |
| 6,305,428 B1 | 10/2001 | Nakamura et al. | | 138/126 |
| 6,347,646 B2 | 2/2002 | Fukui et al. | | 138/129 |
| 6,394,143 B1 | 5/2002 | Diels et al. | | 138/121 |
| 6,659,136 B2 | 12/2003 | Fukui et al. | | 138/125 |
| 6,827,109 B2 | 12/2004 | McCauhtry | | 138/134 |
| 6,932,119 B2 | 8/2005 | Carlson | | 138/121 |
| 6,939,424 B1 | 9/2005 | Takala et al. | | 156/191 |
| 6,948,527 B2 | 9/2005 | Ragner et al. | | 138/119 |
| 7,120,354 B2 | 10/2006 | Mackie et al. | | 392/480 |
| 7,156,127 B2 | 1/2007 | Moulton et al. | | 138/122 |
| 7,431,054 B2 | 10/2008 | Kramer, Jr. et al. | | 138/133 |
| 7,468,116 B2 | 12/2008 | Smith et al. | | 156/344 |
| 7,520,302 B2 | 4/2009 | Smith | | 138/118 |
| 7,597,119 B2 | 10/2009 | Boettner | | 138/119 |
| 7,965,930 B2 | 6/2011 | Carlson et al. | | 392/478 |
| 8,544,504 B2 | 10/2013 | Castro | | 138/121 |
| 8,563,863 B2 | 10/2013 | Carlson | | 174/108 |
| 8,563,864 B2 | 10/2013 | Carlson | | 174/108 |
| 8,691,035 B2 | 4/2014 | Pingleton et al. | | 156/172 |
| 8,709,187 B2 | 4/2014 | Smith et al. | | 156/184 |
| 8,776,836 B2 | 7/2014 | Ragner et al. | | 138/119 |
| 9,308,698 B2 * | 4/2016 | Forrester | | B29D 23/18 |
| 9,322,501 B2 | 4/2016 | Carlson | | 392/478 |
| 9,365,004 B2 * | 6/2016 | Forrester | | F16L 11/115 |
| 9,505,164 B2 | 11/2016 | Garrett et al. | | 156/244.11 |
| 2003/0098084 A1 | 5/2003 | Ragner et al. | | 138/129 |
| 2006/0165829 A1 | 7/2006 | Smith et al. | | 425/113 |
| 2008/0035229 A1 | 2/2008 | Kramer et al. | | 138/132 |
| 2009/0050227 A1 | 2/2009 | Smith | | 138/122 |
| 2009/0078259 A1 | 3/2009 | Kooij et al. | | 128/205.25 |
| 2009/0277525 A1 * | 11/2009 | Jourdan | | A47L 9/248 138/122 |
| 2010/0215351 A1 | 8/2010 | Forrester et al. | | 392/481 |
| 2010/0224276 A1 * | 9/2010 | Forrester | | A47L 9/248 138/122 |
| 2011/0247619 A1 | 10/2011 | Formica et al. | | 128/204.18 |
| 2014/0326395 A1 | 11/2014 | Forrester et al. | | 156/195 |

FOREIGN PATENT DOCUMENTS

| | | |
|---|---|---|
| DE | 3835248 A1 | 10/1988 |
| DE | 40 39 215 A1 | 12/1990 |
| DE | 295 07 806 U2 | 5/1995 |
| DE | 695 27 528 T2 | 5/1995 |
| DE | 197 52 008 A1 | 11/1997 |
| DE | 199 04 864 A1 | 2/1999 |
| DE | 20 2005 013 786 | 12/2005 |
| EP | 0097901 | 6/1983 |
| EP | 0201985 | 2/1986 |
| EP | 0742399 | 5/1996 |
| EP | 0917851 | 11/1997 |

(56) References Cited

FOREIGN PATENT DOCUMENTS

| EP | 1181945 | 2/2002 |
|----|---------|--------|
| WO | WO 2004/011072 | 5/1995 |
| WO | WO 2006/094576 | 1/2006 |

\* cited by examiner

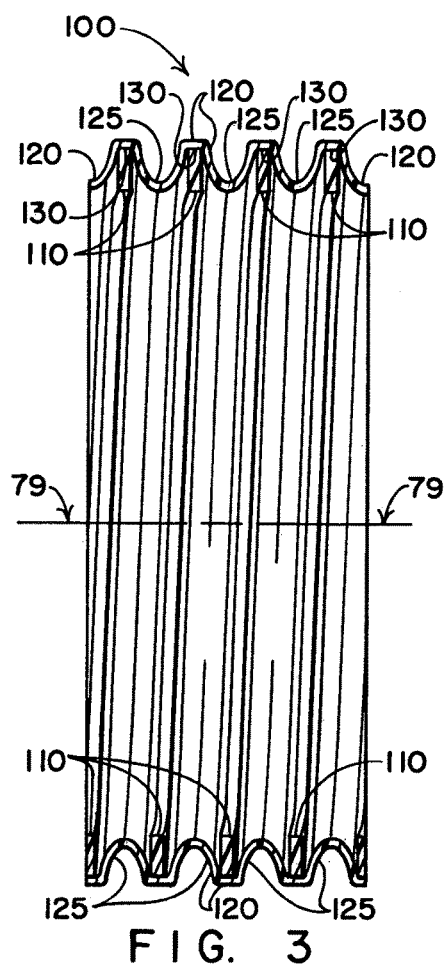
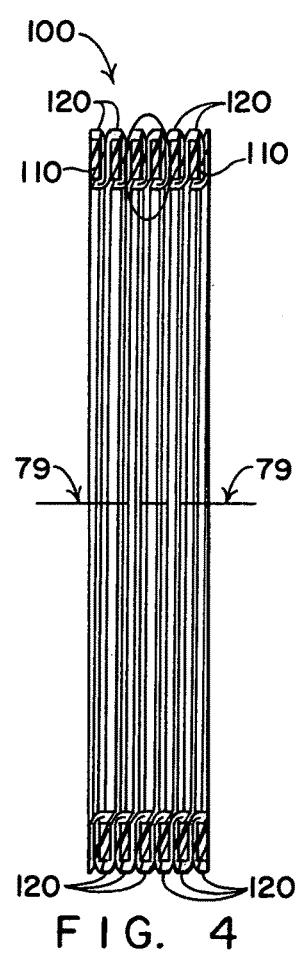
FIG. 3
FIG. 4

STRETCH HOSE AND HOSE PRODUCTION METHOD

REFERENCE TO PROVISIONAL APPLICATIONS

This application claims the benefit of the filing dates of two provisional applications, namely:

1) Ser. No. 61/958,223 filed Jul. 23, 2013 by Martin E. Forrester entitled METHOD OF HOSE PRODUCTION AND STRETCH HOSE PRODUCED THEREBY; and 2) Ser. No. 61/958,099 filed Jul. 19, 2013 by Martin E. Forrester and Carl J. Garrett entitled RADIATION CROSS-LINKING TO ENHANCE PROPERTIES OF STRETCH HOSE.

CROSS-REFERENCE TO RELATED PATENT AND APPLICATIONS

This application is a continuation-in-part of three applications, namely:

1) Ser. No. 13/986,465 filed May 6, 2013 by Martin E. Forrester and Ralf Jourdan entitled METHOD OF HOSE MANUFACTURE which was filed as a continuation of application Ser. No. 12/779,263 filed Apr. 21, 2010 entitled FLEXIBLE, STRETCHABLE, CRUSH RESISTANT HOSE WELL SUITED FOR MEDICAL APPLICATIONS which was filed as a continuation-in-part of application Ser. No. 12/354,291 filed Jan. 15, 2009 (now abandoned); and 2) Ser. No. 13/507,172 filed Jun. 11, 2012 by Carl J. Garrett, Donald K. Hadley and Martin E. Forrester entitled TAPERED HELICALLY REINFORCED HOSE AND ITS MANUFACTURE which claimed the benefit of the filing date of provisional application Ser. No. 61/627,425 filed Oct. 12, 2011 entitled TAPERED FLEXIBLE HOSE AND METHOD OF MANUFACTURE.

3) Ser. No. 13/987,837 filed Sep. 6, 2013 by Martin E. Forrester entitled FLEXIBLE STRETCH HOSE HAVING INWARDLY EXTENDING WEB PORTIONS CONNECTING ADJACENT PAIRS OF REINFORCING COILS, WITH HOSE PROPERTIES ENHANCED BY ANNEALING which was filed as a continuation-in-part of Ser. No. 13/986,465 filed May 6, 2013 (referenced above).

For the information of the Office:

Application Ser. No. 12/779,263 (referenced above) claimed the benefit of the filing date of provisional application Ser. No. 61/335,023 filed Dec. 30, 2009 entitled FLEXIBLE HOSE FOR MEDICAL APPLICATIONS.

Application Ser. No. 12/779,263 (referenced above) issued Jun. 4, 2013 as U.S. Pat. No. 8,453,861.

The disclosures of the above-listed patent and of all of the several applications listed above are incorporated herein by reference.

FIELD OF THE INVENTION

The present invention relates to a flexible, extensible and retractable corrugated hose of a general type known to those who are skilled in the art as a "Stretch Hose" or a "Stretchable/Retractable Hose" that is formed from helically wound thermoplastic material.

The present invention also relates to a hose production method, namely to a method of production of helically reinforced extensible and retractable hose from newly extruded thermoplastic materials that are wound onto a rotating mandrel in a general manner such as is disclosed in the above-referenced application Ser. No. 13/507,172, the disclosure of which is incorporated herein by reference.

The present invention also relates to extensible and retractable "stretch hose" produced in accordance with the hose production method described herein, which is a variation of a hose production method disclosed in the above-referenced U.S. Pat. No. 8,453,681 and in the above-referenced continuation application Ser. No. 13/986,465, the disclosures of which patent and application are incorporated herein by reference.

SUMMARY

One aspect of the present invention relates to a method of continuous production of a stretchable, crush resistant, axially extending hose formed from freshly extruded thermoplastic material—a hose is reinforced by an axially extending helix of reinforcing coils, and can extend to an unusually long length because a thin web that connects each adjacent pair of reinforcing coils is unusually wide.

Another aspect of the invention relates to a hose that can stretch axially to an unusual extent because adjacent pairs of reinforcing coils that are formed by a helix of thermoplastic material have their peripheries bonded continuously to an unusually axially lengthy yet thin web of thermoplastic material that forms a continuous outer wall of the hose.

Still another aspect of the invention relates to a stretch hose of the type just described that, when retracted to a minimal axial length, causes portions of the thin web to extend radially inwardly so as to be sandwiched between the adjacent pairs of reinforcing coils, with innermost portions of the web being folded to extend axially to define interior diameter portions of the retracted hose.

Yet another aspect of the present invention relates to procedures for treating discrete lengths of a stretchable, crush resistant, axially extending hose (preferably of the type described above)—procedures that instill desirable behavioral characteristics in the discrete lengths of hose.

BRIEF DESCRIPTION OF THE DRAWINGS

Features of, and a fuller understanding of the present invention will be better grasped by referring to the following description, taken in conjunction with the accompanying claims and drawings, wherein:

FIG. 3 is an enlarged cross-sectional view of the short length of extended hose shown in FIG. 1, with the view showing as separate components the helical coils of extruded thermoplastic material and a thin cover that is formed by bonding-together portions of a tape-like web of thermoplastic material that is helically wound to overlie the helical coils;

FIG. 4 is an enlarged cross-sectional view of the short length of extended hose that is similar to FIG. 3, but showing the short length of hose axially retracted to its minimal length, with portions of the thin cover of the web of the hose (which extends between and continuously connects each adjacent pair of the reinforcing coils of the hose) sandwiched between adjacent pairs of the helical coils of the hose length;

DESCRIPTION

1. The Stretch Hose Product

Figure 1:
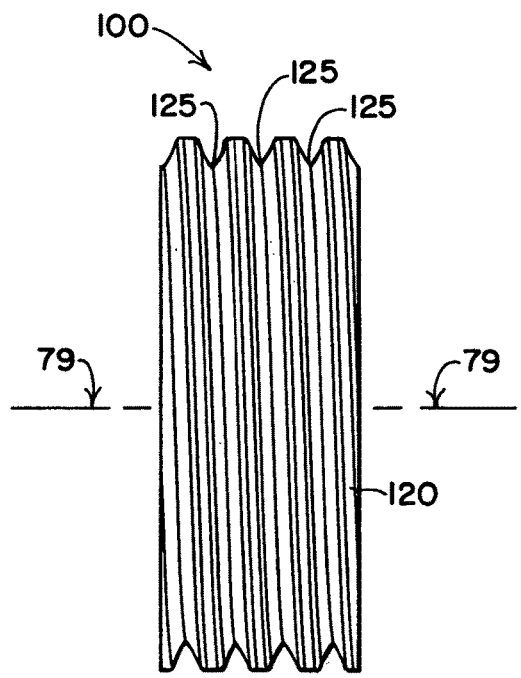
FIG. 1 is a side elevational view of a short length of helically reinforced stretch hose produced in accordance with one method of preferred practice of the present invention, with the hose length shown extended.
Figure 2:
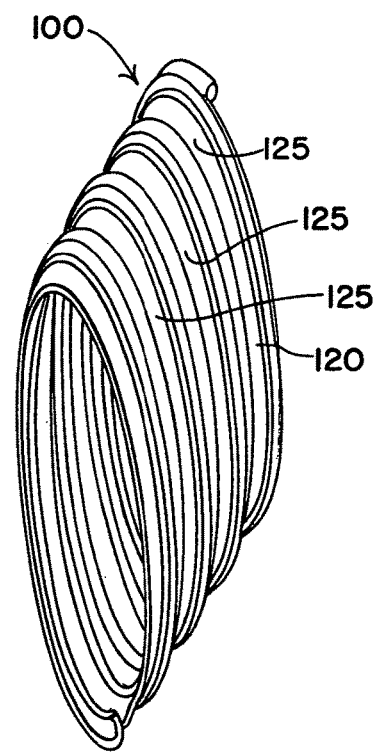
FIG. 2 is a perspective view of the short length of extended hose shown in FIG. 1, with the view showing how the flexibility of the hose permits adjacent coils of the helix to move transversely relative to each other.
Figure 5:
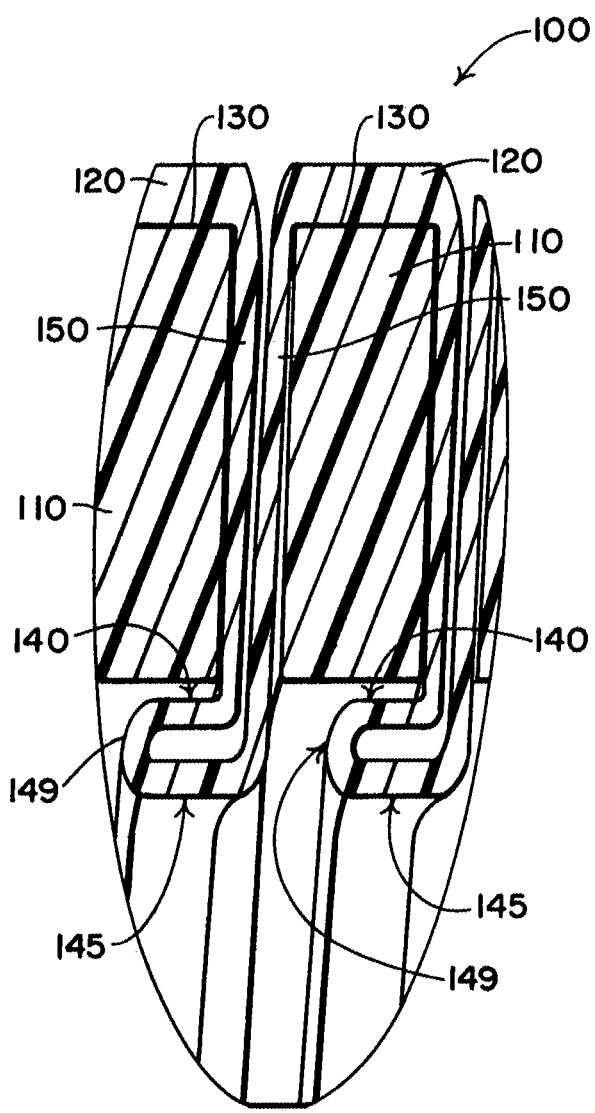
FIG. 5 is an enlargement of a small area designated by an oval in FIG. 4, showing how innermost portions of the thin cover of the web preferably are folded to underlie coils of the helix when the hose length is retracted to its minimal length; and, FIG. 6 is a schematic depiction of a hose production station, and shows how a freshly extruded tape-like, relatively wide yet thin web of thermoplastic material and a freshly extruded bead of thermoplastic material are concurrently helically wrapped around a rotating mandrel to form a substantially endless length of corrugated hose which has reinforcing coils formed by the helically wrapped bead, a cover or outer wall formed by the helically wrapped web, with adjacent pairs of the reinforcing coils having their peripheries bonded to edge regions of the web wraps, and with an arrow indicating a direction of precession followed by the newly formed hose as it travels axially along the rotating mandrel.

Referring to FIGS. 1-5, a short length of flexible, stretchable, crush resistant hose is indicated generally by the numeral 100. In FIGS. 1 and 3 the short hose length 100 is shown partially axially extended. In FIG. 2 the length of hose 100 is shown with its adjacent helical reinforcing coils moved transversely relative to each other—to illustrate a desirable flexibility characteristic of the length of hose 100. In FIGS. 4 and 5, portions of the short length of hose 100 are shown axially retracted (or axially compressed, as the case may be) to what will be referred to as a minimal axial length.

Figure 6:
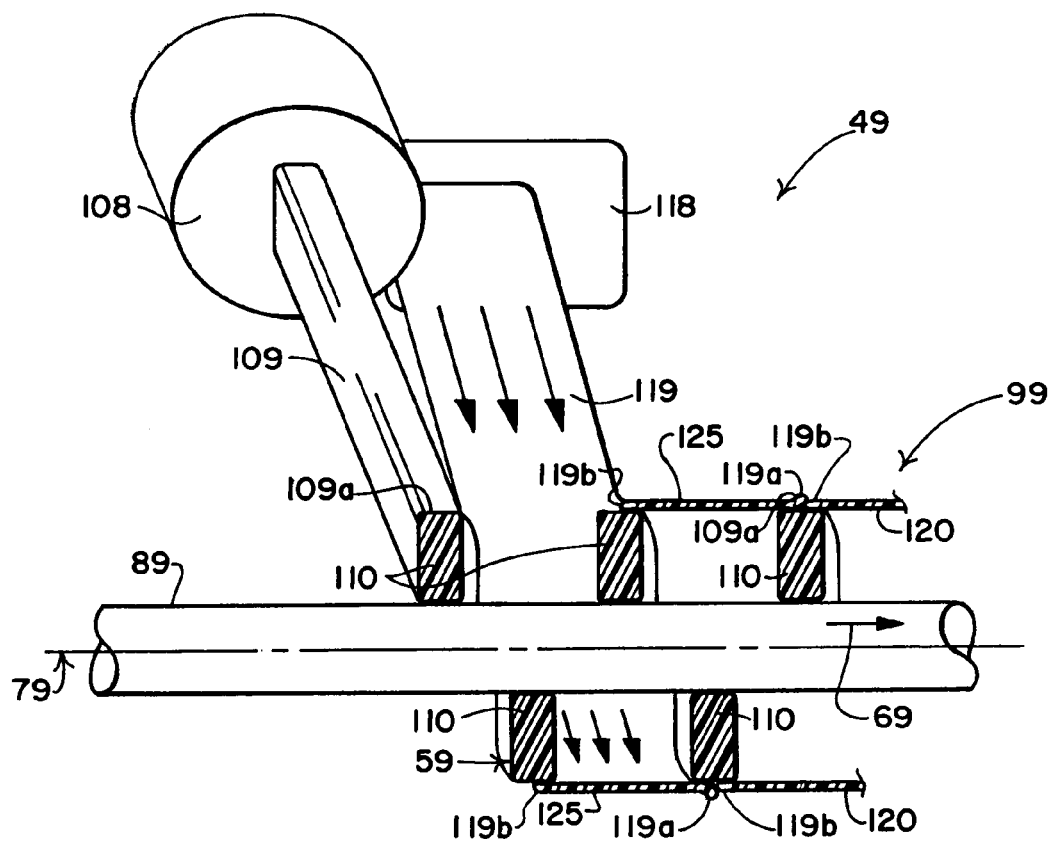

FIG. 6 schematically depicts a hose production station 49, and a method of hose production that takes place at the hose production station 49 which causes substantially continuous production of a stretch hose 99 on a mandrel 89 that rotates about a central axis 79. The short hose length 100 shown in FIGS. 1-5 is a cut off discrete length of the continuous hose 99, and extends substantially concentrically about the central axis 79.

The hose production method depicted in FIG. 6 includes separate but concurrent extrusions from a nozzle 108 of a continuous, solid, strand-like bead 109 of thermoplastic material, and from a nozzle 118 of a continuous, narrow yet wide, tape-like web 119 of thermoplastic material. The nozzles 108, 118 (depicted in FIG. 6) represent any of a wide variety of conventional extruder equipment that is suitable to heat and extrude thermoplastic material in a tacky state that permits the freshly extruded thermoplastic material to bond to other heated, tacky thermoplastic material.

Both the bead 109 and the web 119 maintain substantially uniform cross-sections (that are defined by the extruder nozzles 108, 118, respectively) as the bead 109 and the web 119, respectively, are extruded. The bead 109 and the web 119 are fed toward and are helically wrapped about the rotating mandrel 89 to form the continuously extending hose 99 which precesses (during production of the hose 99) along the rotating mandrel 89 in a direction indicated by an arrow 69. Precession of the hose 99 along the mandrel 89 in the direction of the arrow 69 is primarily due to an application of force to the hose 99 exerted by equipment (not shown) located downstream from the hose production station 49.

The bead 109 is wrapped helically about the rotating mandrel 89 to form a helix 59 of substantially equally spaced reinforcing ribs 110 for the hose 99 that is formed about the mandrel 89. The web 119 is wrapped helically about the rotating mandrel 89 and about the helix 59 to form a continuous cover or outer wall 120 of the hose 99. As will be explained, opposite edge regions 119a, 119b of each newly installed wrap of the web 119 are positioned to engage outermost peripheral regions 109a of the reinforcing ribs 110. And, as will be explained, each newly installed wrap of the web 119 has a leading edge region 119a that very slightly overlaps and bonds almost instantly to a trailing edge 119b of the previously installed wrap of the web 119.

Although the schematic depiction provided by FIG. 6 shows central portions 125 of each wrap of the web 109 extending substantially concentrically about the central axis 79, during formation of the hose 99, the central portions 125 actually often tend to sag radially inwardly toward the central axis 79. This sag of the central portions 125 continues, bringing the central portions 125 into engagement with the mandrel 89. When the newly formed hose 99 is pulled in the direction of arrow 69, the sagging central portions 125 drag on the mandrel 89, and this contributes to the formation of the parallel-extending formations 140, 145 (shown in FIG. 5) being formed as the hose 99 is pulled along and off of the rotating mandrel 89.

To properly understand the makeup of the hose 99 being formed on the rotating mandrel 89, it will be helpful to more fully describe some features of the production method depicted in FIG. 6—whereafter, the text will return to a discussion of specific aspects of the method of hose production.

Referring to FIG. 6, as the freshly extruded (typically tacky) bead 109 and the freshly extruded (typically tacky) web 119 are brought into contact with each other, they bond almost immediately—indeed, substantially instantaneously. As the bead 109 is wrapped about the mandrel 89, the wraps of the bead 109 form the helix 59 of substantially equally spaced reinforcing coils 110.

Continuing to refer to FIG. 6, the reinforcing coils 110 are formed prior to (usually just before) the web 119 is wrapped about the rotating mandrel 89—so that opposed edge regions 119a, 119b of the tacky web 119 can be overlaid to rest upon (and to bond substantially immediately with) peripheries 109a of the reinforcing coils 110. In FIG. 6, the numeral 119a indicates leading edge regions of the wraps of the web 119, and the numeral 119b indicates trailing edge regions of the wraps of the web 119. As FIG. 6 illustrates, each leading edge region 119a of a new web wrap slightly overlaps a trailing edge region 119b of a prior web wrap that is already in place (which is why the leading edge regions 119a are shown located radially outwardly from the trailing edge regions 119b).

In actuality, although the schematic depiction of FIG. 6 shows lines of demarcation that separate the engaged leading and trailing edge regions (119a, 119b, respectively) of the web 119, the fact that the leading and trailing edge regions 119a, 119b engage each other means that these overlapping end regions bond substantially instantaneously—and, this instantaneous bonding leaves no such lines of demarcation, and no such outwardly turned formations (or tell-tale formations of any kind) where the edge regions 119a, 119b overlap. The overlapping edge regions 119a, 119b essentially melt smoothly together as they bond with a peripheral portion of one of the reinforcing ribs 110.

An interesting feature of the hose 100 that is shown in the enlarged view of FIG. 5 is the manner in which the thin outer wall or cover 120 extends inwardly between adjacent ones of the reinforcing coils 110 (as designated in FIG. 5 by the numeral 150), with innermost portions 140, 145 of the thin outer wall or cover 120 folding to underlie the reinforcing coils 110 when the hose length 100 is retracted to the minimal length best shown in FIG. 5. The portions 140, 145 (which extend substantially parallel to the central axis 79 can be seen to execute a reverse turn or fold 149 so the portions 140, 145 overlie each other as they extend in generally axial directions.

A characteristic of the stretch hose 100 that is produced in compliance with what is described just above is the behavior of the hose 100 when extending and retracting between extended modes (such as are depicted in FIGS. 1 and 3, and the minimal length retracted mode best shown in FIG. 5. The hose 100 has something of a snap-action as it extends, and as it retracts, due to the innermost portions 140, 145 folding to and unfolding from the overlying relationship shown in FIG. 5.

In effect, the hose length 100 essentially seems to "pop" as it snaps from a retracted length to an extended length, and back to its retracted length—which provides quite a unique and noticeably pleasant sensation when one pulls on opposite ends of the hose length 100 to extend the hose length 100, and then releases the force that caused the hose length 100 to extend, whereupon the hose length 100 preferably retracts due to a "memory" that has been instilled in the hose length 100 during a stress reduction procedure to which the hose length 100 preferably has been subjected while the hose length 100 is axially compressed to the minimal axial length depicted in FIG. 5 (as will be explained below).

2. Hose Production Method

The hose production method of the present invention is carried out by first forming a substantially continuous length of hose 99 using the production steps described just above, which are depicted in FIG. 6.

When the newly produced hose 99 is axially compressed, parts 150 (FIG. 5) of the central portions 125 that bridge between adjacent pairs of the reinforcing ribs 110 are sandwiched between the adjacent reinforcing ribs 110, and centermost parts of the central portions 125 form a fold or reverse-turn bend 149 (FIG. 5) that lays over as compression continues, which causes the parts 140, 145 to assume the positions shown in FIG. 5.

Stated more simply, as the hose 99 is axially compressed, the central portions 125 assume the configuration shown in FIG. 5, and the fold 149 as well as the parallel-extending parts 140, 145 are formed. The fold-over (indicated in FIG. 5 by the numerals 140, 145, 149) is a result of the web being significantly softer than the reinforcing rib helix 59—and, the configuration of the fold-over that is depicted in FIG. 5 simply occurs quite automatically and naturally without need for any other exertion of force or effort. The length of the parallel-extending parts 140, 145 of the fold-over is directly related to the initial pitch with which the hose 99 is produced. Stating this relationship in another way, the wider the web 119, the longer are the parts 140, 145.

The thermoplastic material used to form the hose is selected to cure slow enough to allow the completed hose 99 to be compressed directly after being produced, and then held in compression until the hose 99 cures while it is retained in compression. Suitable thermoplastic materials are listed in the above-referenced patent and continuation application, the disclosures of which are incorporated herein by reference. The hose product of this production process can also be annealed at a low temperature to reset the compression and to keep the compression consistent along its length.

Discrete lengths (such as the hose length 100) of the hose 99 that is manufactured continuously may be cut into discrete lengths 100, may be axially compressed to the minimum length (such as is shown in FIG. 4), and may then be annealed or otherwise treated to diminish, minimize or eliminate stresses in the hose length 100. If the hose length 100 is cured while being axially compressed to a minimal length, the hose will retain the compressed state once the curing has completed, and will tend to return to the minimal axial length when stretch and then released.

Although experiments are underway to find more ways of treating a newly produced thermoplastic hose held in axial compression to diminish, minimize or eliminate stresses in the hose, two hose treatment stress reduction techniques have come to light that may be used to advantage.

One such technique is to expose an axially compressed length of newly produced thermoplastic hose to radiation to cause cross-linking to occur—a technique that is the subject of one of the provisional applications to which reference is made at the beginning of this application. Radiation exposure can vary along the length of the hose, and can produce cross-linking to an extent that tends to be proportional to the magnitude of the radiation exposure, which can give the hose a spring constant that varies along the length of the hose—which can be useful in many applications.

The other known technique is to anneal an axially compressed length (such as the hose length 100) of newly produced thermoplastic hose—a technique that is disclosed in the previously referenced U.S. Pat. No. 8,453,681 which issued on Jun. 14, 2013 from application Ser. No. 12/779, 263 filed on Apr. 21, 2010 entitled FLEXIBLE, STRETCHABLE, CRUSH RESISTANT HOSE WELL SUITED FOR MEDICAL APPLICATIONS, and in a continuation application Ser. No. 13/986,465 filed May 6, 2013 entitled METHOD OF HOSE MANUFACTURE, the disclosures of both of which are incorporated herein by reference.

A length of hose that is annealed while being axially compressed (as described in the referenced patent and continuation application) will have a uniform spring force measured along the axis of the hose. However, a length of hose that has not been exposed to an annealing process but has been allowed to cure while being held in an axially compressed state will have a variable spring force measured along the axis of the hose, with the spring force being greater at an end that has been cut most recently, and less at an end cut first during production.

Providing a hose length that has a spring force that varies along it length can be of benefit to a customer who wishes to have such a hose length to overcome gravity or other forces that may be applied to the hose length.

3. Scope of the Invention

Although the invention has been described in its preferred form with a certain degree of particularity, it is understood that the present disclosure of the preferred form has been made only by way of example, and that numerous changes in the details of construction and the combination and arrangement of parts and techniques may be resorted to without departing from the spirit and scope of the invention as hereinafter claimed. It is intended to protect whatever features of patentable novelty that exist in the invention disclosed.

What is claimed is:

1. A hose production method comprising the steps of:
   1) concurrently and continuously extruding both a strand-like bead of thermoplastic material of substantially uniform cross-section, and a relatively wide, relatively thin, tape-like web of thermoplastic material of substantially uniform cross-section and having equidistantly spaced, continuously extending edge regions;

2) wrapping the freshly extruded strand-like bead around and in engagement with peripheral portions of a rotating mandrel to provide a substantially uniformly spaced array of reinforcing coils for a hose that is being formed so as to extend along a central axis of the rotating mandrel;

3) helically wrapping the freshly extruded web about the rotating mandrel with the equidistantly spaced edge regions of the wrapped web continuously contacting and substantially immediately bonding to outer peripheral portions of each adjacent pair of the reinforcing coils, and with each new helical wrap of the web having a leading one of the equidistantly spaced edge regions overlapping and bonding substantially immediately and continuously to a trailing one of the equidistantly spaced edge regions of a previous wrap of the web; and 4) annealing the hose while the hose is axially compressed to cause central portions of the web that extend between adjacent ones of the reinforcing coils to extend inward toward the central axis when the hose is subsequently axially compressed a minimal axial length.

2. The hose production method of claim 1 additionally including the step of cutting a discrete length of hose from the hose produced by the method.

3. The hose production method of claim 2 additionally including the step of treating the discrete length of hose to diminish such stress as may have been instilled in the discrete length of hose.

4. The hose production method of claim 3 wherein treating the discrete length of hose comprises relaxing molecules of the thermoplastic material such that stress is substantially absent from the hose when the hose is retracted to the minimal axial length.

5. The hose production method of claim 1 additionally including the step of treating the hose while axially compressed to effect cross-linking.

6. The hose production method of claim 1 wherein the central portions define at least part of an interior diameter of the hose when the hose is retracted to the minimal axial length after the annealing.

7. The hose production method of claim 1 additionally including the step of annealing the hose to set a reverse-turn fold in the central portions of the web while the hose is axially compressed to the minimal axial length to cause the central portions of the web to return to the reverse-turn fold when the hose is retracted to the minimal axial length after the annealing.

8. The hose production method of claim 7 wherein, at the reverse-turn fold, the central portions extend along the central axis when the hose is retracted to the minimal axial length after annealing.

9. The hose production method of claim 7 wherein the hose exhibits a noticeable snap action when at least a portion of the reverse-turn fold unfolds during an axial extension of the hose from the minimal axial length after the annealing.

* * * * *